UNITED STATES PATENT OFFICE.

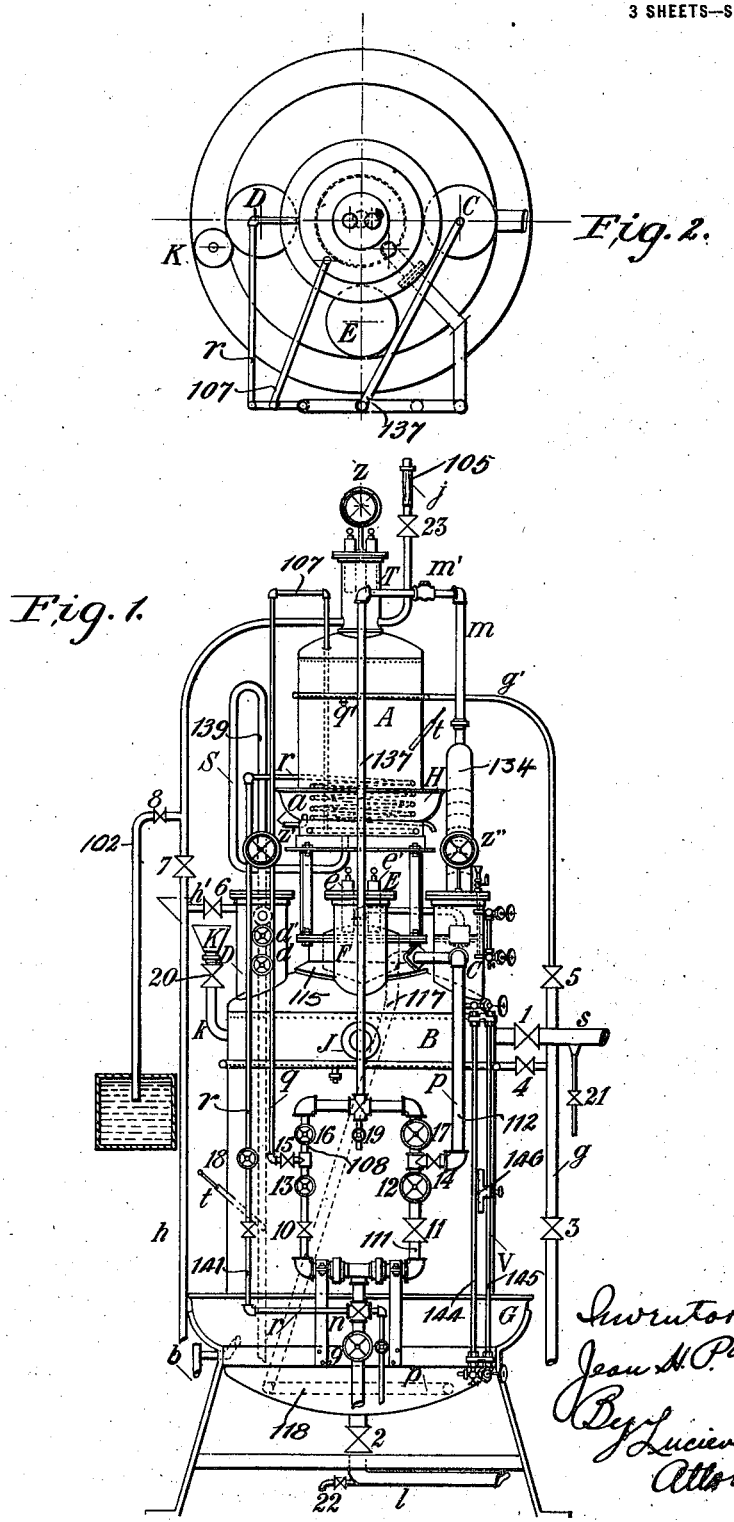

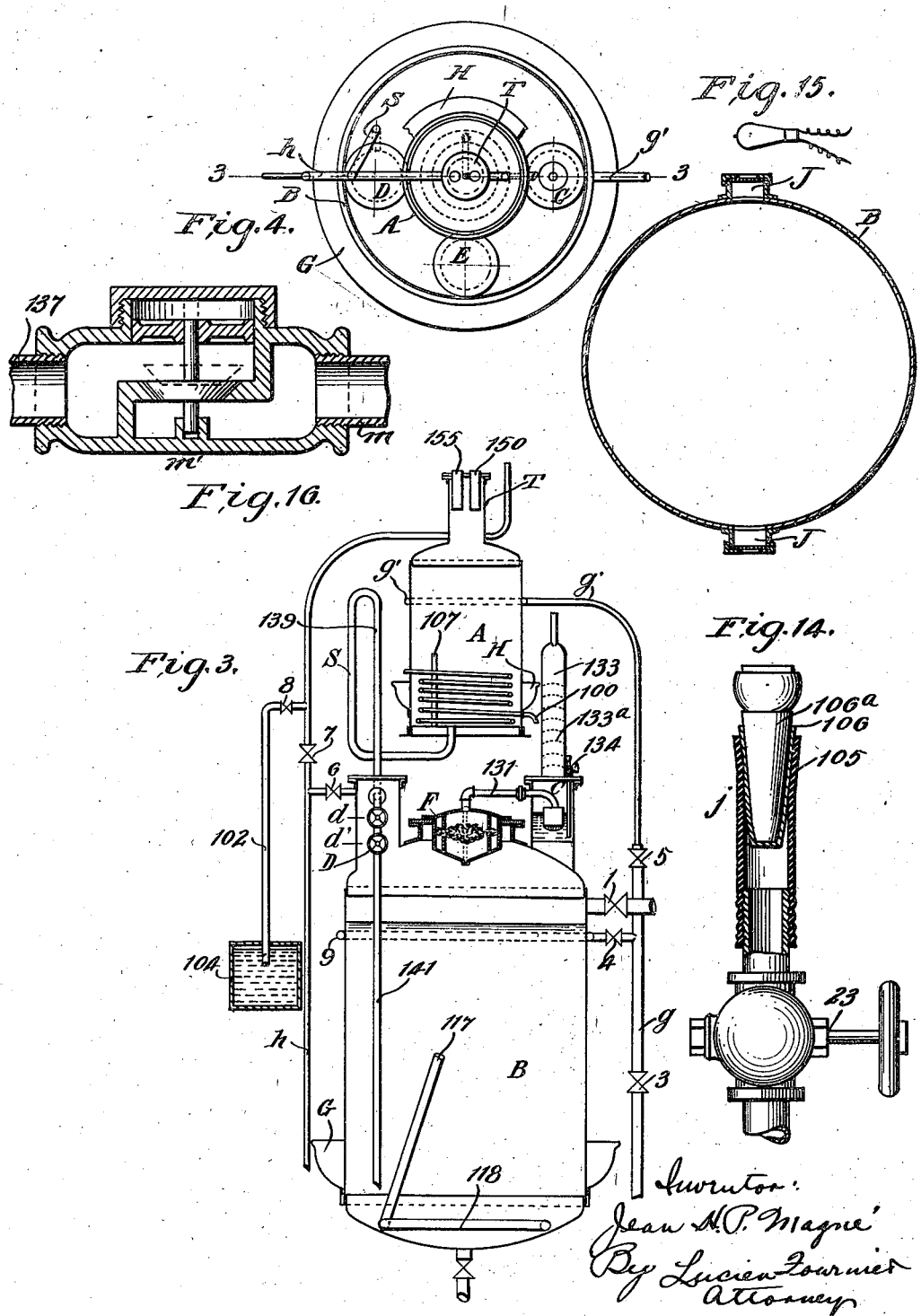

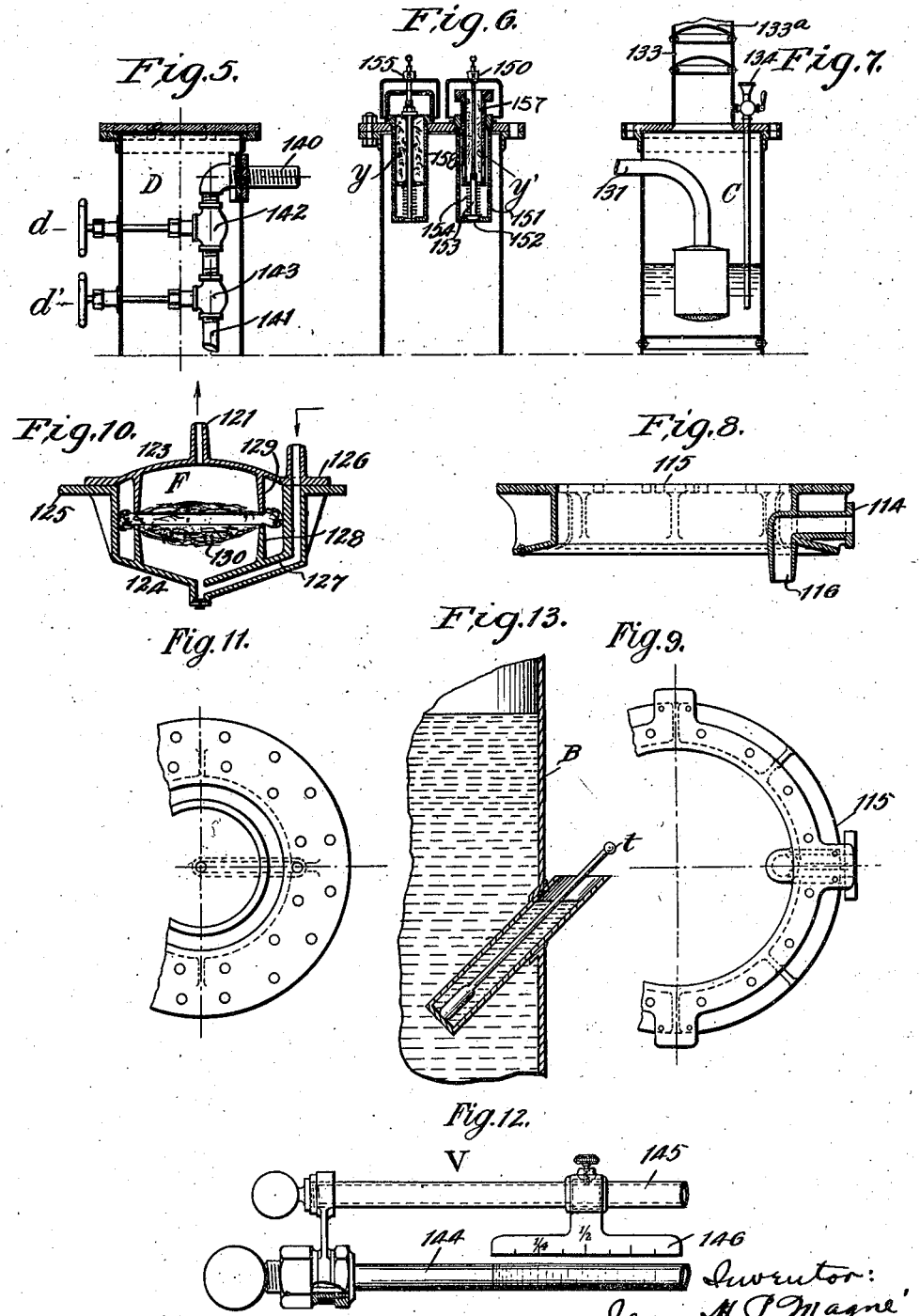

JEAN HENRI PASCAL MAGNÉ, OF MEXICO, MEXICO.

PURE-CULTURE APPARATUS FOR YEAST, MUCORINI, MOLDS, BACILLI, &c.

1,212,656. Specification of Letters Patent. Patented Jan. 16, 1917.

Application filed June 19, 1916. Serial No. 104,645.

*To all whom it may concern:*

Be it known that I, JEAN H. P. MAGNÉ, citizen of France, residing at Calle Isabel la Católica No. 72, Mexico city, Republic of Mexico, have invented a pure-culture apparatus for yeast, mucorini, molds, bacilli, &c., and generally for all microörganisms used in industrial processes, such as alcohol manufacture and other fermentation industries which find application either in medicine or pharmacy.

This invention relates to an apparatus for the reproduction or multiplication and the culture, artificially, of selected microörganisms, and, while being multiplied and cultured, maintaining them thoroughly isolated from those of species other than that selected and continuing the multiplication and culture indefinitely through repeated successive stages in regions that are maintained continuously shut off from contact with external bodies capable of transmitting infection agencies. The mechanism is particularly well adapted for the multiplication and culture of organisms of the yeast class and similar microörganisms, such as mucorini, molds, etc. It can be used to advantage in treating any of the microörganisms utilized in industrial processes, such as the manufacture of alcohol, distilled or fermented liquors, and products used in bread making.

Of the drawings Figure 1 is a front elevation of an apparatus embodying my improvements; Fig. 2 is a diagrammatic view showing in plan the relative positions of some of the parts of the apparatus; Fig. 3 is a vertical sectional view of some of the parts, taken on the plane indicated by the line 3—3, Fig. 4; Fig. 4 is a diagrammatic plan of the parts indicated in Fig. 3; Fig. 5 is a vertical section of the cylindrical projection at the left on the lower vat, as shown in Fig. 1; Fig. 6 is a vertical section of the cylindrical projection on the lower vat, shown as in the center of Fig. 1; Fig. 7 is a vertical section of the secondary part of the air filter; Fig. 8 is a central transverse section of the crowning head casting secured centrally to the top of the lower vat; Fig. 9 is a top view of a part of this casting; Fig. 10 is a vertical section of the primary part of the air sterilizer; Fig. 11 is a plan view of a portion of the lower element of the sterilizing device shown in Fig. 10; Fig. 12 is a view detached of the devices which constitute the fluid gages for the two vats; and Figs. 13, 14, 15 and 16 illustrate details.

The apparatus comprises an upper smaller vat A and a lower larger vat B. These are formed of suitable metal, such as copper. With them are combined a set of devices for supplying wort fluid or other culture medium; devices for initially supplying under completely sterilizing circumstances a small initial quantity of ferment and then permanently sealing the supply orifice; a set of devices for transferring fluid from either vat to the other; means for heating the fluid contents of the vats to the boiling point if necessary; means for cooling the vats by the application of water externally; means for thoroughly sterilizing a stream of air and delivering it to the vats separately or simultaneously; means for delivering streams of steam to the vats, the parts being so arranged that the sterilized air and the steam can be delivered to the vats largely through the same conduit system; means for ascertaining the volumes or depths of the fluid masses in the vats; means for ascertaining the condition of the fluid contents in either of the vats; means for ascertaining the temperature in either of the vats; means for preventing the rise of internal pressure in either of the vats; means for preventing the drop of internal pressure below a predetermined point; means for introducing bodies, such as chemicals, into either of the vats, particularly the larger one; means for preventing the travel of any fluids or moisture in a backward direction along the air ducts, that is, backward therein relatively to the path of advance of the air; and the vats, the piping, the valves therein, and the other necessary parts being also arranged that the interiors of the vats and of the various ducts can be maintained indefinitely without contacting with external gases or other external bodies, and without permitting the entrance of any such external bodies, after the commencement of the initial operation.

The smaller vat is superposed relatively to the larger. The latter is provided at the top with a centrally arranged crown head casting 115. Upon the upper flange of this head are secured the uprights or frame parts upon which rests the upper vat A. The latter, at its upper end, has an upwardly extending cylindrical projection T provided with a pressure gage $z$ and with pressure and vacuum reliefs to be described. With the lower part of the dome chamber communicates the feed pipe for primarily introducing the single initial supply of ferment, it having a valve at 23 and an inlet at $j$ to be described. Vat A also has a coil communicating with external piping at $r$ and having its terminal carried through the vat wall and projecting as shown at 100. At $t$ there is an inclined outwardly opening tube for holding fluid, into which a thermometer can be inserted. $h$ is a pipe communicating, at its upper end, with the vat A and extending downward to the lower end of the apparatus. It has two branch pipes at $h'$ and 102, respectively, having valves 6 and 8. A piping with a siphon S communicates with the lower part of vat A and extends downward into the lower vat. 107 indicates piping, the upper end part of which is passed through the top of the vat A and has its lower end in the bottom part of its interior, terminating preferably in a perforated ring.

The lower vat B, considerably larger than the vat A (from fifteen to twenty times as large) is supported on a bottom frame. At the center of the top is tightly secured the crown head 115. This is formed with a duct having nipples 114 and 116. In the central opening through this head is arranged the primary part of the air sterilizer formed in two parts 123 and 124. These are two castings, one with a flange 125 for fastening it to the upper flange of the head 115, and the other having a flange 126 for securing it to the flange of the part 124. The lower part has an internal flange 128 and the upper part has a corresponding flange 129. Between these flanges there is clamped a stratum or layer of cotton 130. 127 is an air duct formed in these castings and delivering air to the under side of the sterilized cotton stratum. The vat B is supplied with wort from the main at $s$ through the piping and valve at 1, the ducts at $s$ having a drainage pipe and valve at 21. The vat B has an upwardly extending cylindrical projection D, the interior of which communicates through a branch pipe with the piping at $h$ under control of a valve at 6. In the interior of the cylindrical projection D are situated the valves which control the flow of fluid from one vat to the other. The vat B also has a second cylindrical projection E which is furnished with relief devices to guard against excessive differences between the internal and external pressure. To the duct 114, 116, through the crowning head 115 there is connected a pipe 117 which extends from the head to the bottom of vat B, and there communicates with a perforated ring or coil 118. The piping from the bottom of the upper vat A passes through the wall of the cylindrical projection D and then extends downward through the interior of the latter to the bottom of the vat B. The vat B is provided with a pipe $k$, terminating in an upwardly opening funnel K and having a control valve 20; these being for the purpose of introducing chemicals as desired.

The vats are cooled by water delivered from the piping $g$, $g'$ communicating with perforated ring pipes $q$, $q'$ there being one of the latter around the upper part of each of the vats.

The piping and valves for controlling the introduction of steam or air to the vats are situated in front of the apparatus. Steam can be allowed to pass the valve 9 to the piping $r$ to reach the coil in vat A, this piping being controlled by the valve 18. The inlet steam pipe also communicates with vertical pipings at 108 and 111. On the left-hand side the piping 107 leads to the top vat, extending to the bottom of the latter as described. On the right, the piping 111 leads to the piping 112 which communicates, as above described, with the interior of the lower vat. The air pipe 137 communicates with both of the pipings at 108 and 111. If steam is desired in the upper vat through the piping at $r$, the valves 10 and 11 are closed, and the valves 9 and 18 are opened. If steam is desired in the upper vat through the piping 107, the valves 11, 16 and 18 are closed, and those at 9, 10, 13 and 15 are opened. If steam is desired in the lower vat B and not in the vat A, the valves 10, 18 and 17 are closed, and those at 11, 12 and 14 are opened. If air is desired in the vat A through the piping at 107, the valves 13 and 17 are closed, and those at 15 and 16 are opened. If air is desired in the vat B and not in the vat A, the valves at 12 and 16 are closed, and those at 14 and 17 are opened, whereupon the air will pass through the ducts at 112, 114, 116, and 117, thus the piping and valve systems at 107, 108, 111, 112 and 117 can be utilized for the admission either of steam or air.

The ducts and sterilizing devices for the air comprise the following. The nipple orifice at 127 of the sterilizer F is connected with the main of a compressor or air reservoir. The air is forced down through the aforesaid duct 127 to the chamber in the sterilizer F below the sterilizing cotton or equivalent 130, then up through the latter, and out through the central nipple or pipe coupling. Thence it passes through the duct 121 to the secondary sterilizer C. This comprises a vessel holding a body of solution fluid containing copper sulfate. The air is forcefully dispersed and disseminated through the fluid, rising as an effervescing or bubbling mass. It passes from this secondary sterilizer C through the purifying and drying apparatus at 134, this comprising a cylinder 133 in which there is placed a number of parallel, horizontally arranged, concavo-convex, finely perforated plates 133ª arranged with their concave sides downward. The air rising from the sterilizing solution in the vessel at C carries with it more or less of the fluid, either in liquid or vaporous condition. This is condensed upon the perforated disks or, if in liquid condition, is caught by them and arrested, and flows back to the reservoir. Enough of these baffle disks are used to effectually separate the fluid. To insure a perfect separation, the air piping is carried up, as at $m$, to the top of the apparatus, and then connected to a long vertical pipe 137, there being a check valve at $m'$ between the parts $m$ and 137. The long down pipe 137 for the air communicates with the above described piping systems at 108 and 111. And it is provided at 19 with a drip catch and a valve.

Any fluid that is to be initially introduced into the vat A is delivered through the devices at $j$. These consist of a rubber tube 105 secured at one end to the nipple of the valve 23. In the other end there is secured a removable copper plug 106, preferably in the form of a hollow copper cone, into which is firmly inserted a wooden filler 106ª by which it can be manipulated. These parts can be sterilized by a flame. As above indicated, there is occasion for passing fluid first from the upper vat to the lower, and then from the lower to the upper. The siphon pipe 138 extends downward, as at 139, and by an elbow at 140 is connected to the piping 141 inside of the cylinder D and the vat B. This piping 141 has two duplicate valves 142 and 143 inside the cylinder. The stems of these valves have stuffing box fittings in their globes which are secured to the piping 141. Any liquid from condensation or from other sources which may escape from the piping at 141 at the seats of the stems does so in a sterilized region; and any fluid or gas tending to pass into the piping comes from a sterilized region. The valve stems are extended outward through the wall of the cylinder and are furnished with hand wheels $d$, $d'$, the stems being tightly packed in the apertures. And at these passages for the stems there is never sufficient pressure to cause leakage in either direction of any infecting gas or fluid.

Each of the cylindrical projections T and E is provided with a pair of peculiarly constructed safety devices to guard against excessive differences between the pressure on the interior and the exterior. The safety device to prevent excessive internal pressure is indicated at 150. It is composed of a relatively long tube 151 which extends downward from the top into the interior of the cylinder. In the lower end is the valve seat with a valve 152 which is held in position by a center stem 153 and a spring 154. 157 is a concentric tube fitted within the tube 151. This tube is also elongated and filled with a sterilizing mass, such as cotton, or equivalent material, indicated at $y'$. When the pressure in the interior (either of steam or air) passes a predetermined amount, the valve 152 yields and the pressure is relieved; and any air or moisture tending to move in either direction must pass through the sterilizing material. The safety device at 155 for preventing too severe a drop of internal pressure has a valve with a stem and spring which operate in opposite directions, in comparison with those of the pressure safety; that is to say, they yield inward when the interior pressure falls below a predetermined point. They are held in an elongated tube 158 which is also filled with a sterilizing or antiseptic material $y$; and any air which, from differences in pressure, is drawn inward, will be sterilized in passing through the tube.

Reference has been made to the check valve $m'$ in the piping that delivers the sterilized air. This valve prevents any back pressure of air or moisture from reaching the sterilizing material at F. It is of the utmost importance that the cotton, or equivalent material, at F should be kept free from moisture and any foreign materials that might be driven backward through the apparatus. It is necessary that the cotton be uniformly and permanently porous at all points. It is held, as described, in a stratum or diaphragm-like layer, being clamped between the flange cylinders 128 and 129 which prevent it from choking either the air inlet or the air outlet from the sterilizer and hold it as a uniformly porous mass. The check valve prevents any excessive increase in back pressure when the air ducts are open, either from carbon dioxid, air or steam. This back pressure may, without such check valve, be felt at points beyond the air sterilizing devices, as in the sterilizing fluid at C and the sterilizing cotton at F.

The depth and the volume of the fluid masses in the two receptacles A and B, respectively, are revealed at all times to the operator at a single point of observation; as follows. By the side of the vat B there is arranged a glass sight tube 144, the ends of which communicate with short ducts extending laterally from the vat B; this may be one of the standard liquid gages used with fluid receptacles. Adjacent, and parallel to, this gage tube 144 is a guide 145. The tube 144 is graduated in the usual manner and indicates the depth of the fluid in the vat B; and the guide 145 carries an adjustable indicator 146. The latter is graduated in such way as to indicate the depth of the fluid in the upper vat A at any time, the upper body of fluid always having a certain ratio or relation to the volume of that in the lower vat. As the top surface of the gage column at 144 falls or rises, it registers with graduations on the indicator 146, and these announce the volume of the fluid in the vat A relatively to its holding capacity. For example, when the top surface of the fluid in the gage 144 is at a certain point, it will be opposite a character on the indicator 146 which will show, for instance, that the upper vat A is one-half full; and at another point the relative volume will be similarly indicated as one-third or one-fourth of the total.

The method of operating the apparatus is as follows: Assume that the vats A and B are empty after being sterilized by the introduction of steam. The copper plug 106 is removed from tube 105 and a charge (eight or ten gallons, or thereabout) of wort or equivalent culture medium is introduced into the vat A through the supply duct at $j$, the valve 23 being opened; and the vat is filled until about two-thirds full. Then steam is introduced to the coil in the bottom of vat A through the piping $r$, controlled by the valves 9 and 15, those at 10 and 13 being opened, and that at 16 closed. The steam is generally utilized to raise the medium fluid to the boiling point. The steam introduced in the vat A sterilizes the interior thereof, and also of the cylindrical projection T and of those parts of the several pipes which are in communication with A, including that at $j$, the valve 23 being temporarily (for about thirty minutes) left open for the escape of steam therethrough. Then the parts at $j$ are sterilized in the way below described in detail; the plug 106 is inserted in the tube 105, and the valve 23 is closed. For a period of about thirty to forty-five minutes the valves at 23, 7 and 8 are maintained closed. The pressure within the vat A rises (the steam still flowing) to about five pounds with a corresponding raising of the boiling temperature. Then the valve 8 is opened, allowing the escape of steam through the piping $h$ and 102. The contents of the vat A are cooled down by cooling water which comes through the aforesaid pipe $g$, $g$, controlled by valves 3, 4 and 5, the water escaping through the perforated ring $q'$ around vat A. The water that trickles therefrom downward around the outer surface of the vat A is collected in bowl H and taken off to the waste by discharge pipe $a$. Just before turning on the cooling water, a small amount of air under pressure should be admitted to assist in controlling the drop of the pressure and avoid forming a vacuum or causing back suction through such orifices or ducts as those at $h$ and 102. When the pressure and the temperature in the vat A have been sufficiently reduced, an antiseptic sealing device, such as a vessel with a disinfecting fluid as at 104, is connected to the end of pipe 102 to prevent the entrance of unsterilized air. The first charge of wort or culturing medium supplied to the vat A, as just described, can be brought from a general reservoir through piping (not illustrated) and delivered at $j$. Having heated the contents of vat A in the way described, and then having cooled them to about 30° C., the contents of the vat are further aerated for a period. This is done by admitting sterilized air through the piping 137, 108 and 107, the valves at 13 and 17 being closed, and those at 15 and 16 opened. The air passes to the bottom of the fluid in vat A where it is distributed throughout the mass; this continuing until the contents are ready for the introduction of the seed yeast.

A sealed bottle or suitable vessel containing a small quantity of pure culture yeast (specially and carefully prepared in the laboratory) is opened at a point immediately adjacent the end of the tubing at $j$; the copper plug is carefully removed, and the contents of the vessel are poured in; the tubing, the copper plug, and all adjacent parts being enveloped in a voluminous sterilizing flame. Then while the neighboring parts at $j$ are still kept at high heat and the plug is being sterilized by the flame, it is put tightly in place in the tubing, and the valve 23 is closed. While the initial seed yeast is being thus introduced, the stream of sterilized air is still supplied to the vat A and is continued to effect a thorough commingling of the yeast and the previously sterilized medium. Fermentation commences therein and continues for a period varying, according to circumstances.

During the period of fermentation carbon dioxid gas is generated, which, after a time, produces a pressure in the upper part of vat A and adjoining ducts; which pressure is soon sufficient to force the gas outward and downward through the piping at $h$ and 102. This gas causes effervescence or bubbling in the antiseptic liquid at 104; and by this the operator is informed, from time to time, of the extent of the fermentation that is occurring in the vat A. When he observes that the fermentation has started, he again introduces sterilized air to assist in the development of the cells. Before the fermentation in this vat A is completed, steps are taken to prepare a larger volume of culturing medium in the vat B and get it ready to be fermented. At a suitable moment a charge of the medium is introduced into the vat B through the piping at $s$ and 1, and the volume in the vat is increased until the surface of the fluid is visible at the sight glass J. At the same time, the parts at K and k are used for introducing such supplemental materials as are designed to assist the ferment germs in their activity, either materials of the class which reduce the resisting efficiency of the ingredients of the culturing medium, or materials of the classes which are known to nourish the germ cells during their growth and propagation, being such as ammonium sulfate and sulfuric acid, or equivalents. Then the supply of wort through piping at $s'$ is shut off and the treatment of the contents in vat A is commenced. They are first boiled by the introduction of steam through the piping 111, 112 and 117. During the first ten minutes, or thereabout, of the boiling period, the valves at 20, 12 and 6 are left open. Those at 20 and 6 are then closed and the pressure is raised in the interior of vat B, the steam supply continuing and the heat is continued for a period until the contents of the interiors of the vat B and its ducts are completely sterilized. The valve 6 is then opened and steam is allowed to escape through the piping at $h$. The cooling water is delivered to the outside of vat B from the piping at $g$ through the perforated ring $q$, the valve at 5 being closed, and the valves at 3 and 4 opened. At about the same time, preferably just before turning on the cooling water, the air valves are slightly opened sufficiently to allow enough air to pass through the pipes 111, 112 and 117 to compensate for any vacuum that may tend to form upon the cooling and condensing of the steam and the drop in temperature on the interior. When the pressure and temperature have sufficiently dropped, as a result of shutting off the steam, and the supplying of the cooling water and air, the lower end of the pipe at $h$ can be sealed by devices similar to those at 104. The cooling water is collected in the bowl G at the bottom of vat B and escapes through the discharge at $b$. After the contents have been cooled to the proper point, they are aerated by introducing sterilized air from pipe 137 through piping 111, 112 and 117, the valves at 12 and 16 being closed, and those at 14 and 17 opened. The aerating of the contents of the vat B is continued as long as is necessary, and then the valve 17 is closed. The fluid in the vat B is now ready to receive the fermenting fluid in the upper vat A, which, by assumption, has been allowed to progress to the point where it can be advantageously withdrawn to the lower vat. To so withdraw it, a body of sterilized air is introduced into the upper vat by utilizing the ducts and the valves that have been heretofore described. The pressure rises until the air forces the fluid from vat A through the siphon pipes at 138, and thence downward through the piping 139 and 141, controlled by the inclosed valves 142 and 143. The fluid escapes from pipe 141 in the lower part of vat B and is there commingled with the culturing medium which has been prepared in the way just described.

The vats are proportioned as to their capacities approximately as above indicated, and, generally, the volume of the fluid in the upper vat A is proportioned to the volume in the lower vat about as one to fifteen or twenty. Hence, when the charge from A has been forced downward into the vat B, the total volume of the fluid in the latter is not materially increased. After the two bodies have been commingled in the way described, the mixture is agitated in the vat B by closing such valves as those at 12 and 16, again opening those at 14 and 17, and permitting the air to pass to the coil 118 and escape with an agitating action in the fluid. As this air gradually increases in volume in the vat B, its pressure rises. And after there has been sufficient agitating and mixing of the two bodies of fluid, the valves at $d$ and $d'$ are again opened, and then the pressure of the air in the lower vat B causes a portion of the fluid therein to move backward up to piping at 141 and through the siphon into the upper vat; this continuing until the volume in that vat is about two-thirds of its capacity.

After the proper amount of fluid has been raised in the way described from the lower vat to the upper one, all of the valves are again closed except those at 6, 7 and 8, the ends of the piping $h$ being seated, as above described, and another period of fermentation starts in the upper vat A. The remainder of the fluid left in the lower vat B now commences to ferment and continues to do so during a predetermined period, say, from twelve to twenty-four hours, cell formation being assisted by introducing air as required. At the termination of such period, the contents are drawn off from the vat through the piping at $l$, controlled by valve 2, and taken to the points where it is to be used as seed yeast for still larger quantities of the culturing medium. After this vat B has been thus emptied, it can, at a suitable time, be again charged with a quantity of the medium, which, in turn, is sterilized, cooled, aerated, and otherwise treated in the way above described. And, thereupon, it is ready to receive the second mass of fluid (partially fermented) in the vat A which was previously elevated thereto. This smaller mass in vat A is again brought down through the siphon and connected piping to the lower vat; and after being thoroughly commingled with the newly introduced medium in said lower vat, a portion of the total volume is again elevated through the piping and the siphon to the upper vat.

The stages set forth can (after the first introduction of the laboratory yeast at *j* and the sealing of the orifice) be carried on indefinitely, the apparatus being so constructed and having its parts so arranged that, for a long period of time, there is no necessity for opening it at any point in such way as to allow any infecting of the interior contents from any external source except under circumstances where a complete disinfection can be caused by boiling and steaming. All of the internally exposed surfaces, all of the ducts, valves, and active parts of the attachments are sterilized at successive stages of operation.

The system of piping at *h* and 102 with several external openings enables the operator at any time to ascertain the progress in the treatment of the materials in either of the vats independently of each other.

The sight opening at J I have found to be of great importance in securing accurate observations of the phenomena in the interior. The escape piping *h* serves to give information as to the temperature pressure, volume, and other conditions of the gases or steam; but I have found that in the generation of seed yeast it frequently happens that fermentation will proceed to a considerable extent and yet give no indications such as are manifested through the pipes at *h* and 102. The indications will be unmistakable if visible to the skilled operator, such as the varyings in coloration, the formation of froth or scum, and the like. A sight opening, such as that a J, furnishes this important supplemental means for ascertaining the conditions of the contents of the vat. Preferably, there are two of these sight holes diametrically opposite. And if an electric, or equivalent, light be placed adjacent to one of them, the surface of the fermenting fluid on the exterior is completely revealed to an observer at the other sight aperture.

At Z' and Z" there are pressure gages, one communicating with the interior of the cylinder D and vat B, and the other with the interior of the air duct.

The thermometric devices at *t*, *t*, are peculiarly well adapted to ascertain the temperature of a fermenting fluid which it is essential to maintain isolated from sterilizing agencies.

*t'* is a fluid mass adapted to abstract heat from neighboring bodies and retain it in uniformity to permit it to be accurately measured; such as glycerin, or a suitable oil. This fluid mass is elongated and so supported in a hermetically joined holder that it will extend down into, but be kept separate from, the body of fermenting fluid. A thermometer can be introduced from the outside into this fluid mass and withdrawn without danger of infecting the vat.

When the air is to be introduced, it is important to know the rate and force with which it is being propelled through the ducts. At one time a relatively gentle stream of the air is to be preferred, while at another time it is desirable to introduce it with energy and in considerable volume. If the valves 16 and 17 be closed and that at 19 opened, the operator can ascertain the pressure and rate of travel of the air before turning it into either of the vats; and after so ascertaining these, he can open or adjust either of the valves 16 or 17 with the nicety required for the varying purposes.

I herein use the term "culturing media", and also "wort", but do not mean to be understood as limiting any of the features of the present invention to any specific culturing material. My apparatus can be used to great advantage wherever it is desired to produce a strong, vital and pure microörganic culture. And by the above terms referring to the fermentable medium I include such specific bodies as the wort obtained from cereals, the wash obtained in the tropics from saccharine masses, the mosto composed of similar ingredients and others capable of furnishing nutriment to the bacteria or bacilli which are used for any of the industrial processes in which they are now employed.

What I claim is:

1. In an apparatus of the class described, the combination of the smaller initial vat, the larger secondary vat, means for supplying steam to the vats, means for conducting air under pressure to the vats, a sterilizing mechanism for said air having a sterilizing medium arranged to be enveloped by the volume of steam utilized in the vats, an air-drying or separating device, and a duct for taking air therefrom to the aforesaid air-conducting means.

2. In an apparatus of the class described, the combination of the smaller initial vat, the larger secondary vat, means for introducing steam to the vats, an air-sterilizing mechanism having an air chamber containing a sterilizer and arranged to be enveloped by the steam in one of the vats, a second air sterilizer containing a sterilizing fluid, means for drying or separating the air from moisture, and a duct for taking the air therefrom to either or both of the vats.

3. In an apparatus of the class described, the combination of the smaller initial vat, the larger secondary vat, means for taking liquid from either vat to the other, means for conducting steam to the vats, air-sterilizing mechanism having a primary sterilizing device and a secondary sterilizing device, both adjacent to the steam chamber in a vat and one arranged to be enveloped by the steam therein, an elongated air-drying apparatus communicating with the said sterilizing devices, and a duct for taking the air therefrom to either of the vats.

4. In an apparatus of the class described, the combination of the smaller initial vat, the larger secondary vat, means for conducting liquid from one of said vats to the other, an air-sterilizing mechanism, a duct for supplying air thereto, a duct for taking air therefrom to the interiors of the vats, and automatically acting means for preventing the back flow of gases or moisture from the vats toward the air-sterilizing mechanism.

5. In an apparatus of the class described, the combination of the smaller initial vat, the larger secondary vat, means for conducting fluid from one of said vats to the other, an air-sterilizing mechanism having a primary sterilizing chamber with an inlet orifice and an outlet orifice, means for holding a stratum of sterilizing or filtering fiber in integral condition at points remote from the orifices, said fiber holder being inclosed but arranged to be surrounded by the steam in one of the vats, a duct from the air sterilizer communicating with the vats, and automatically acting devices for preventing gas or moisture from flowing backward from the vats toward the air-sterilizing means.

6. In an apparatus of the class described, the combination of the smaller initial vat, the larger secondary vat, means for conducting fluid from one of the vats to the other, means for conducting steam to the vats, an air-sterilizing mechanism having a chamber with an inlet orifice and an outlet orifice, devices for holding the sterilizing filter in an expanded stratum remote from the orifices, said chamber being arranged to be enveloped by the steam in the vat, a duct from the air sterilizer leading to the vats, and means for automatically preventing the back flow of gas or moisture to the air sterilizer.

7. In an apparatus of the class described, the combination of the smaller initial vat, the larger secondary vat, means for conducting liquid from one vat to the other, means for conducting steam to the vats, air-sterilizing mechanism having a primary element formed with a chamber containing a widely extended stratum transverse to the path of the air and arranged to be surrounded by steam in the vat, a secondary element containing a liquid sterilizer for the air, a third element having a series of concavo-convex perforated plates adapted to dry the air, a duct extending from the air-sterilizing devices to the vats, and automatically operating means for preventing the back flow of gas or moisture from the vats toward the air-sterilizing mechanism.

8. In an apparatus of the class described, the combination of the relatively smaller initial vat, the relatively larger secondary vat, means for forcing liquid from either vat to the other, means for delivering air under pressure to either of the vats at option, means for delivering steam to either of the vats at option and for raising and lowering the pressure thereof in a vat, devices combined with each of the vats for permitting steam or air, when the pressure rises beyond a predetermined point, to escape, and means for sterilizing the escape passages.

9. In an apparatus of the class described, the combination of the relatively smaller initial vat, the relatively larger secondary vat, means for forcing liquid from either of said vats to the other, means for delivering steam to the interior of either of the vats, means for delivering air under pressure to either of the vats, devices combined with each of the vats for automatically permitting external air to enter when the interior pressure drops below a predetermined point, and means for sterilizing the entering air and the passages through which it enters.

10. The combination of the initial smaller vat, the secondary larger vat, means for delivering steam to the interiors of the vats, ducts for normally conveying the exhaust steam from the said vats, valves for closing said ducts, supplemental sterilized passages from the interiors of the vats to the open atmosphere, and automatically acting closures for opening and closing the said supplemental sterilized passages.

11. The combination of the initial smaller vat, the larger secondary vat, the duct connecting the vats, the valve for opening and closing said duct, means for supplying bodies of steam in the interiors of said vats, means for cooling said vats and lowering the pressure therein, ducts for normally conducting the exhaust steam out from the vats, valves for closing said ducts, sterilized air passages connecting the interiors of the vats with the atmosphere, and automatically acting closures for opening and closing the said sterilized passages in predetermined correspondence with the pressure on the interiors.

12. In an apparatus of the class described, the relatively smaller initial vat, the relatively larger secondary vat, the means for conducting fermenting fluid from either vat to the other, means for introducing air to either vat, ducts for taking away the gaseous products of fermentation from both of the vats, and a duct for connecting the said ducts together whereby said gaseous products from both vats can be delivered at one point or the gaseous products from the two vats can be delivered independently.

13. In an apparatus of the class described, the combination of the relatively smaller initial vat, the relatively larger secondary vat, the means for conducting fermenting fluid from either vat to the other, means for causing the generation of steam in either of the vats from the liquid therein and raising or lowering the pressure of said steam, and independent ducts through which the steam can be permitted at option to escape from the said vats.

14. In an apparatus of the class described, the combination of the smaller initial vat, the larger secondary vat, a duct for conveying ferment fluid from either vat to the other, said duct having a part thereof arranged within a sterilized region, a valve controlling the said duct also within said sterilized region, and means for actuating the valve extending from said region to the outside atmosphere.

15. In an apparatus of the class described, the combination of the smaller initial vat, the larger secondary vat, said vats being adapted to hold fermenting fluid, means for forcing the fluid from one vat to the other, a duct for the said material, a valve in the said duct situated in a sterilized region inclosed by a wall, and a valve-actuating device extending from the duct through the sterilized region and through a gas-tight bearing in said wall and adapted to be manually controlled on the exterior.

16. In an apparatus of the class described, the combination of the relatively smaller initial vat, the relatively larger secondary vat, said vats being adapted to contain fermenting fluid, means for conducting fermenting fluid from either vat to the other, an initial supply duct for the smaller vat comprising a flexible tube, and a removable closure for the tube formed of a relatively non-oxidizable metal adapted to be sterilized by the superficial application of high heat.

17. In an apparatus of the class described, the combination of the relatively smaller initial vat, the relatively larger secondary vat, said vats being adapted to contain fermenting fluid, means for conducting fermenting fluid from either vat to the other, an initial supply duct for the smaller vat comprising a flexible tube, a removable closure for the tube consisting of a thin non-oxidizible tube with a closed end and adapted to be sterilized by the application of flame, and a non-conducting handle or holder secured to said metallic tube.

18. The combination of the secondary larger vat, the initial smaller vat placed immediately above the larger vat, means for supplying steam to the interiors of the said vats, the steam chamber communicating with the larger vat, the duct for transferring ferment fluid from one vat to the other, and valves and valve seats for controlling said duct and positioned in said steam chamber, the portion of the duct between the valves and the smaller vat being relatively elongated to prevent the conduction of heat from the larger vat to the smaller one.

19. The combination of the secondary larger vat, the initial smaller vat positioned above the larger vat, means for supplying steam to and heating the larger vat, a duct for the transfer of ferment fluids from one vat to the other, and valves and valve seats in said duct in the region of the heat in the larger vat, that portion of said duct between the valves and the smaller vat being relatively elongated to prevent the transmission of heat along the duct to the upper vat.

20. In a fermentation apparatus, the combination of the larger secondary vat, the smaller primary vat above the secondary vat, means for conducting air to the bottom parts of the fluid masses in the said vats respectively, an air sterilizer having a chamber between the said vats and surrounded by a wall positioned in the steam space in the upper part of the interior of the lower vat, air inlet and exit orifices for the said chamber, a septum of filtering fiber arranged in the chamber transversely to the air passage, means for separably clamping the septum in a position remote from both the inlet and exit orifices whereby there are provided sealed air chambers on both sides of said septum and between it and the air orifices, and means adapted to conduct air from said chamber to the aforesaid bottom parts of the fluid masses.

21. In a fermentation apparatus, the combination with the lower secondary vat and the smaller primary vat positioned immediately above the secondary vat, of devices for supplying air to the said vats, the air sterilizer having an air receiver hermetically sealed in the wall of the lower vat, a removable cover for said receiver, a filamentary cotton-like filter removably suspended in said receiver and clamped in position substantially as set forth to provide separated air chambers, one above and one below said septum and respectively between the septum and the inlet and outlet air orifices, and ducts connecting the said chamber to the interiors of the vats.

J. MAGNÉ

Witnesses:
LUCIEN FOURNIER,
JOSÉ OWANANOS.